United States Patent
Watanabe et al.

(10) Patent No.: US 9,783,242 B2
(45) Date of Patent: Oct. 10, 2017

(54) WIND-NOISE REDUCTION STRUCTURE FOR VEHICLE

(71) Applicant: FUJI JUKOGYO KABUSHIKI KAISHA, Tokyo (JP)

(72) Inventors: Naoto Watanabe, Tokyo (JP); Yusaku Dogahira, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 15/271,602

(22) Filed: Sep. 21, 2016

(65) Prior Publication Data

US 2017/0088185 A1  Mar. 30, 2017

(30) Foreign Application Priority Data

Sep. 30, 2015  (JP) .................................. 2015-192615

(51) Int. Cl.
| | | |
|---|---|---|
| B60S 1/04 | (2006.01) | |
| B62D 25/08 | (2006.01) | |
| B60J 1/02 | (2006.01) | |
| B62D 25/04 | (2006.01) | |
| B62D 35/00 | (2006.01) | |

(52) U.S. Cl.
CPC .............. *B62D 25/081* (2013.01); *B60J 1/02* (2013.01); *B62D 25/04* (2013.01); *B62D 35/00* (2013.01)

(58) Field of Classification Search
CPC ......... H01L 2924/0002; H01L 2924/00; G06F 1/20; F03D 1/04; Y02E 10/74; B62D 25/081; B62D 25/088; B60R 21/36; B60R 2021/343; B60R 13/07

USPC ..................................... 296/192, 180.1, 91
See application file for complete search history.

(56) References Cited

U.S. PATENT DOCUMENTS

| | | | | |
|---|---|---|---|---|
| 4,146,263 | A * | 3/1979 | Watari ....................... | B60J 1/02 296/192 |
| 4,466,654 | A * | 8/1984 | Abe ........................... | B60H 1/28 15/250.16 |
| 4,766,805 | A * | 8/1988 | Sato .......................... | B60S 1/54 454/127 |
| 4,909,566 | A * | 3/1990 | Hashimoto .............. | B60H 1/24 296/192 |
| 4,962,961 | A * | 10/1990 | Ito ........................ | B62D 25/081 296/192 |
| 5,139,458 | A * | 8/1992 | Koukal .................... | B60H 1/28 454/147 |

(Continued)

FOREIGN PATENT DOCUMENTS

| | | |
|---|---|---|
| JP | S58-139283 | 9/1983 |
| JP | S59-114373 | 8/1984 |

(Continued)

OTHER PUBLICATIONS

Japanese Office Action dated Nov. 22, 2016, in Patent Application No. 2015-192615 (6 pages—Japanese with English machine translation).

*Primary Examiner* — Kiran B Patel
(74) *Attorney, Agent, or Firm* — Smith, Gambrell & Russell, LLP

(57) ABSTRACT

A lateral end of a cowl panel is provided with an airflow outlet duct having an airflow outlet hole in a side surface of a front fender. The airflow outlet hole is located below a rising start section of a front pillar.

12 Claims, 6 Drawing Sheets

(56) References Cited

U.S. PATENT DOCUMENTS

| | | | | |
|---|---|---|---|---|
| 5,533,779 | A * | 7/1996 | Epple | B60H 3/0085 |
| | | | | 15/250.01 |
| 5,692,953 | A * | 12/1997 | Bell | B60H 1/28 |
| | | | | 296/192 |
| 6,193,304 | B1 * | 2/2001 | Takahashi | B60J 1/02 |
| | | | | 296/187.04 |
| 9,452,785 | B2 * | 9/2016 | Tsuneyama | B62D 25/081 |
| 2005/0067859 | A1 * | 3/2005 | Yoshii | B62D 25/081 |
| | | | | 296/192 |
| 2005/0179285 | A1 * | 8/2005 | Nakajima | B62D 25/081 |
| | | | | 296/192 |
| 2009/0146459 | A1 * | 6/2009 | Watanabe | B60H 1/28 |
| | | | | 296/192 |
| 2017/0057463 | A1 * | 3/2017 | Yamamoto | B60S 1/0402 |
| 2017/0088198 | A1 * | 3/2017 | Dogahira | B62D 35/005 |

FOREIGN PATENT DOCUMENTS

| | | |
|---|---|---|
| JP | S60-163174 | 10/1985 |
| JP | S61-82882 | 5/1986 |
| JP | S61-205832 | 12/1986 |
| JP | H06-60583 | 8/1994 |
| JP | 08-127365 | 5/1996 |
| JP | 2000-280934 | 10/2000 |
| JP | 2001-018840 | 1/2001 |
| JP | 2009-248773 | 10/2009 |
| JP | 2015-083459 | 4/2015 |

* cited by examiner

WIND-NOISE REDUCTION STRUCTURE FOR VEHICLE

CROSS-REFERENCE TO RELATED APPLICATIONS

The present application claims priority from Japanese Patent Application No. 2015-192615 filed on Sep. 30, 2015, the entire contents of which are hereby incorporated by reference.

BACKGROUND

1. Technical Field

The present invention relates to vehicle wind-noise reduction structures for suppressing wind noise occurring near front pillars.

2. Related Art

A vehicle, such as an automobile, has a front windshield provided at the upper front surface of a vehicle cabin and front pillars provided at the opposite sides of the front windshield in the width direction. The front pillars are inclined rearward together with the front windshield from the lower ends toward the upper ends, and side windows are located to the rear of the front pillars. A cowl extending in the width direction of a vehicle body is disposed at the lower edge of the front windshield. This cowl is used for draining rainwater dripping down from the front windshield to the outside of the vehicle and also for introducing outside air into the vehicle cabin. For instance, see Japanese Unexamined Patent Application Publication No. 8-127365.

The cowl is disposed between the front windshield and a front hood. In recent years, gutter-type cowl panels are mainly used in place of box-type cowl panels. Normally, a cowl panel is manufactured by plastic injection molding and has a cross-sectionally U-shaped or V-shaped gutter directly below the front windshield. The opposite ends of the gutter are located at the inner sides of front fenders in the width direction. The gutter is curved rearward from the center toward the left and right sides so as to conform to the curved lower edge of the front windshield in plan view. For instance, see Japanese Unexamined Patent Application Publication No. 2000-280934.

When an automobile is running, the sounds of the engine, the tires, and the wind become noise for a vehicle occupant and causes reduced comfortability for the vehicle occupant. In particular, wind noise near the front pillars (which will be simply referred to as "wind noise" hereinafter) occurs in areas near the heads of the vehicle occupants at the driver seat and the passenger seat and thus causes a reduced level of comfort in the automobile. Wind noise is produced by air flowing along the front surface of the front windshield and then flowing rearward from the front pillars. Specifically, the air flowing along the front surface of the front windshield becomes a vertical vortex, which flows around toward the center of the vehicle body, immediately after separating from the rear edges of the front pillars and collides with air flowing alongside the front pillars so as to produce wind noise.

The loudness of wind noise has a positive correlation with the amount of air flowing rearward from the front pillars. In an automobile equipped with the above-described cowl panel, the loudness of wind noise increases due to an increase in the amount of air flowing below the front pillars. Specifically, a portion of air flowing along the front surface of the front hood is blown into a gutter space of the cowl panel and subsequently flows through the rear-curving gutter space in the width direction. The air flowing to the opposite widthwise ends of the gutter space changes its direction and flows upward by colliding with the inner side surfaces of the front fenders in the width direction, travels over the front fenders, flows in the width direction along the front surface of the front windshield, and merges with the flow of air flowing below the front pillars. As a result, the amount of air separating from the lower rear edges of the front pillars increases, so that the above-described vertical vortex becomes larger, thus resulting in increased loudness of wind noise.

SUMMARY OF THE INVENTION

It is desirable to provide a vehicle wind-noise reduction structure that may prevent air flowing through a gutter space of a cowl panel from merging with the flow of air near front pillars so as to reduce wind noise.

An aspect of the present invention provides a vehicle wind-noise reduction structure for a vehicle. The vehicle includes a front windshield provided above a main body, a front pillar that rises rearward and obliquely upward from the main body and supports a lateral edge of the front windshield, and a cowl that is provided below the front windshield and constitutes a gutter space. The structure includes a lateral end of the cowl that is provided with an airflow outlet path extending continuously to the gutter space and has an opening in a side surface of the main body. The opening of the airflow outlet path is located below a rising start section where the front pillar starts to rise from the main body.

DETAILED DESCRIPTION

FIGS. 1 to 7 illustrate an example of the present invention.

Figure 1:
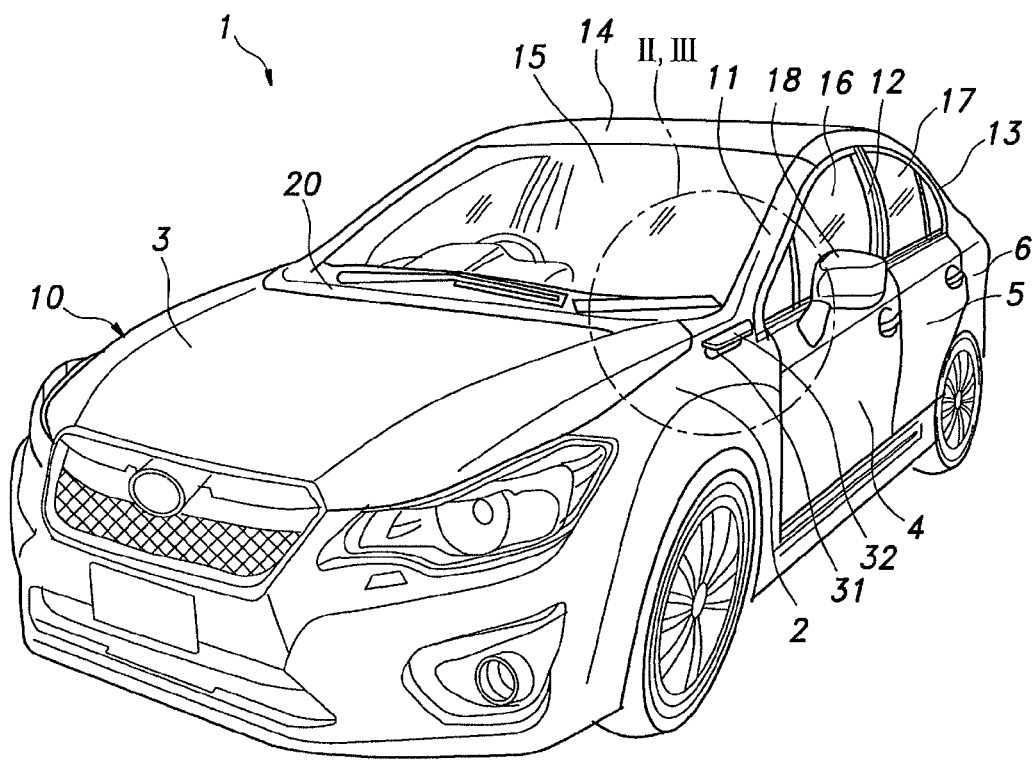
FIG. 1 is an overall perspective view of an automobile according to an example of the present invention.

An automobile 1 serving as a vehicle equipped with a wind-noise reduction structure according to an example of the present invention is a sedan-type passenger car and has a main body 10 serving as an outer shell constituted of front fenders 2, a front hood 3, front doors 4, rear doors 5, and rear fenders 6, as illustrated in FIG. 1. Front pillars 11, center pillars 12, and rear pillars 13 extend upward from the main body 10, and a roof 14 is supported by the upper ends of the pillars 11 to 13.

The front pillars 11 and the roof 14 support outer edges of a front windshield 15 that defines the upper front surface of a vehicle cabin. The front windshield 15 has a curved shape that is inclined rearward in its entirety, and the front pillars 11 are inclined rearward in correspondence with the inclined lateral edges of the front windshield 15. The front doors 4 and the rear doors 5 respectively support side glass windows 16 and 17 in a vertically movable manner. An upper section of each front door 4 has a door mirror 18 attached thereto.

Figure 4:
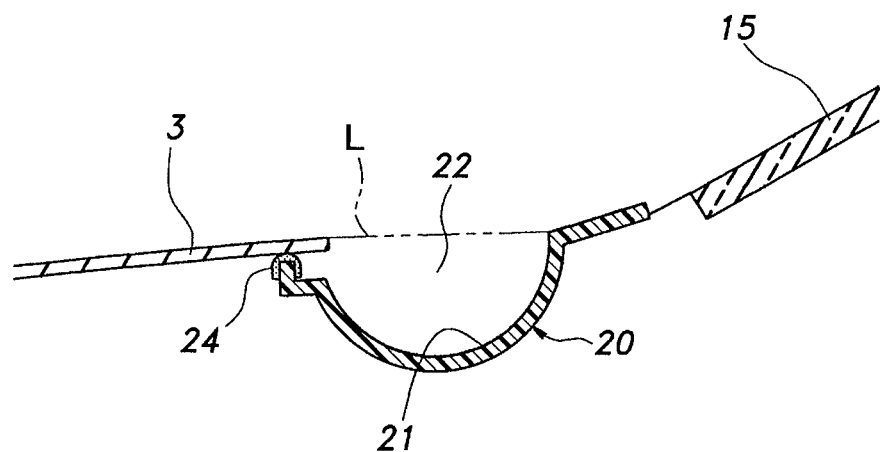
FIG. 4 is an enlarged cross-sectional view taken along line IV-IV in FIG. 2.
Figure 5:
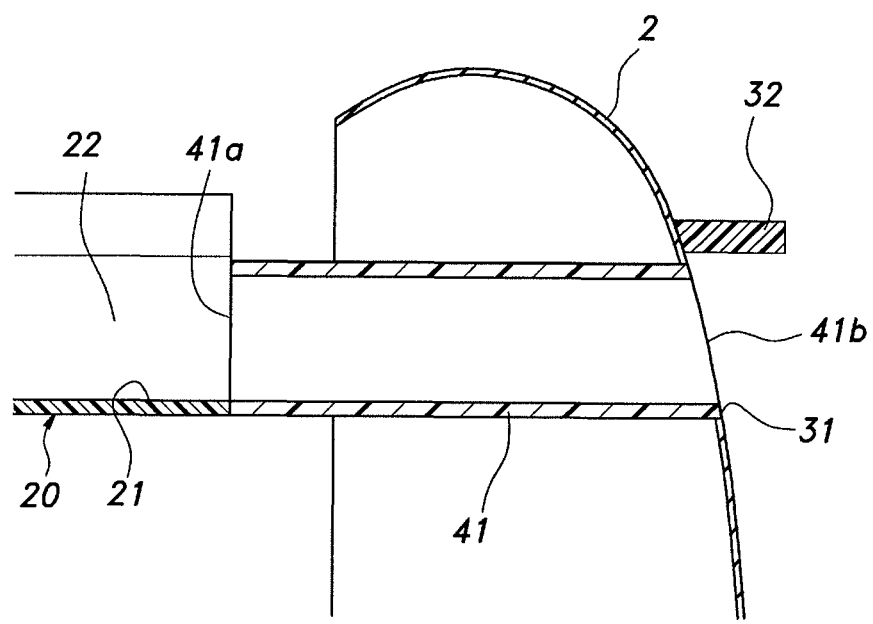
FIG. 5 is an enlarged cross-sectional view taken along line V-V in FIG. 3.

A cowl panel 20, which is a plastic injection-molded component extending in the vehicle width direction, is attached to the front of the lower edge of the front windshield 15. As illustrated in FIG. 4, the cowl panel 20 has a gutter 21, which is circular-arc-shaped in cross section, for draining rainwater flowing from the front hood 3 and the front windshield 15 when driving in the rain. The gutter 21 is curved rearward from the center toward the left and right sides so as to conform to the curved lower edge of the front windshield 15. A gutter space 22, which is substantially semicircular in cross section, is defined between the gutter 21 and an extension line L extending rearward from the front hood 3.

Figure 2:
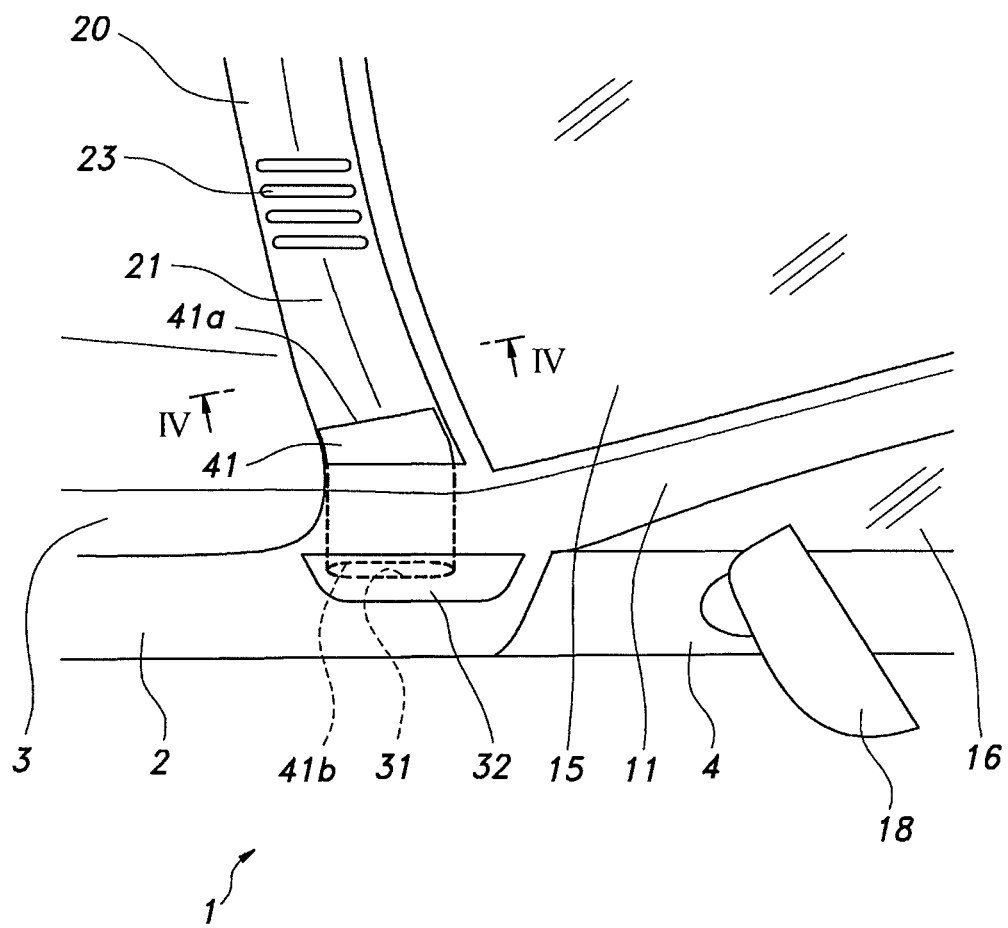
FIG. 2 is an enlarged plan view of area II in FIG. 1.

As illustrated in FIG. 2, the cowl panel 20 has a plurality of outside-air inlet holes 23 for introducing outside air into the vehicle cabin. Moreover, a rubber seal 24 closely in contact with the lower surface of the front hood 3 is attached to the front edge of the cowl panel 20. The cowl panel 20 covers, for instance, a wiper mechanism (including a wiper motor and wiper arms) (not illustrated) attached to the bulkhead.

Figure 3:
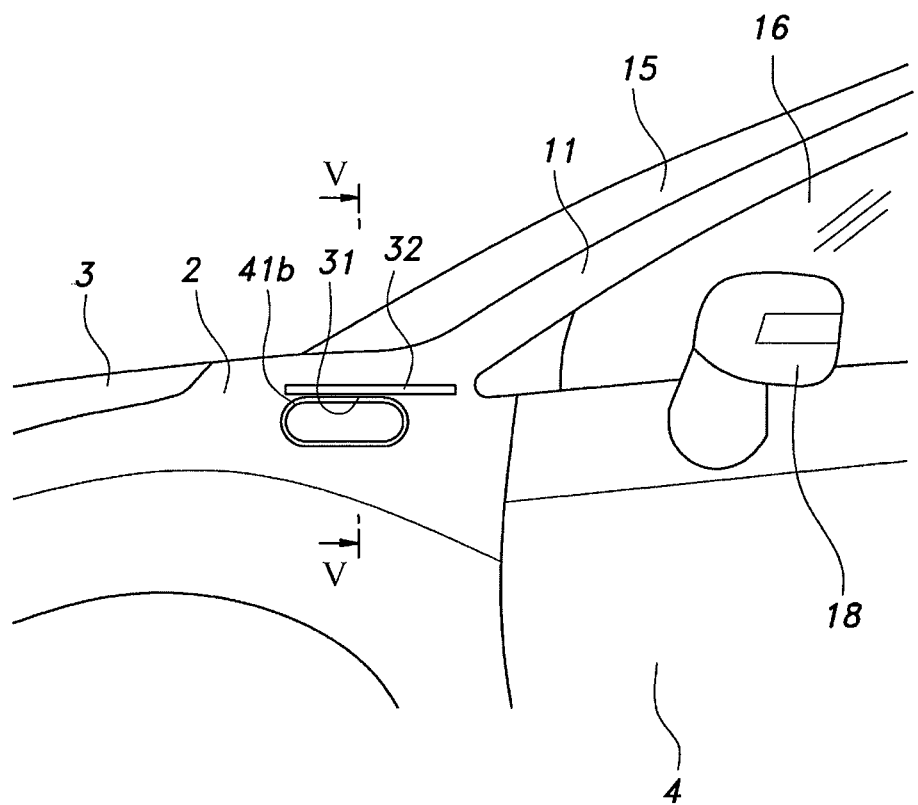
FIG. 3 is an enlarged side view of area III in FIG. 1.

As illustrated in FIG. 3, each front fender 2 has an airflow outlet hole 31 serving as an oval opening that is long in the front-rear direction, and is also provided with a rectifying plate 32 serving as a rectangular rectifying member that is long in the front-rear direction and disposed directly above the airflow outlet hole 31. In side view, the airflow outlet hole 31 is located at substantially the same position as the gutter space 22. Specifically, the airflow outlet hole 31 is located immediately in front of the base of the front pillar 11 in the front-rear direction and below a rising start section where the front pillar 11 starts to rise from the main body 10 in the up-down direction. With regard to the rectifying plate 32, the front end thereof is located at substantially the same position as the front end of the airflow outlet hole 31, but the rear end extends further rearward than the rear end of the airflow outlet hole 31. The rectifying plate 32 is attached to the front fender 2 by using a plastic pin (not illustrated) provided in an attachment surface so that the rectifying plate 32 falls off easily during a collision. Alternatively, the rectifying plate 32 may be fastened to the front fender 2 from the reverse side (inner side) thereof by using, for instance, a screw.

An airflow outlet duct 41, which is a plastic injection-molded component and serves as a tubular airflow outlet path, is disposed at each of the lateral ends of the cowl panel 20 so as to allow the gutter space 22 and the airflow outlet hole 31 in the front fender 2 to communicate with each other. The airflow outlet duct 41 has an inner end (air inlet side) 41a having a substantially semicircular cross section and extending continuously to the gutter space 22, and also has an outer end (air outlet side) 41b having an oval cross section and extending continuously to the airflow outlet hole 31. The airflow outlet duct 41 has a cross-sectional area larger than or equal to the cross-sectional area of the gutter space 22 and has a duct shape that is substantially fixed. The airflow outlet duct 41 extends abeam from the end of the cowl panel 20, and the lateral end of the airflow outlet duct 41 is fitted in the airflow outlet hole 31.

When the automobile 1 having the above-described configuration moves forward, most of the air flowing above the front hood 3 flows rearward from the front windshield 15 via the roof 14 and the front pillars 11, and a portion of the air flows into the gutter space 22 of the cowl panel 20.

Figure 6:
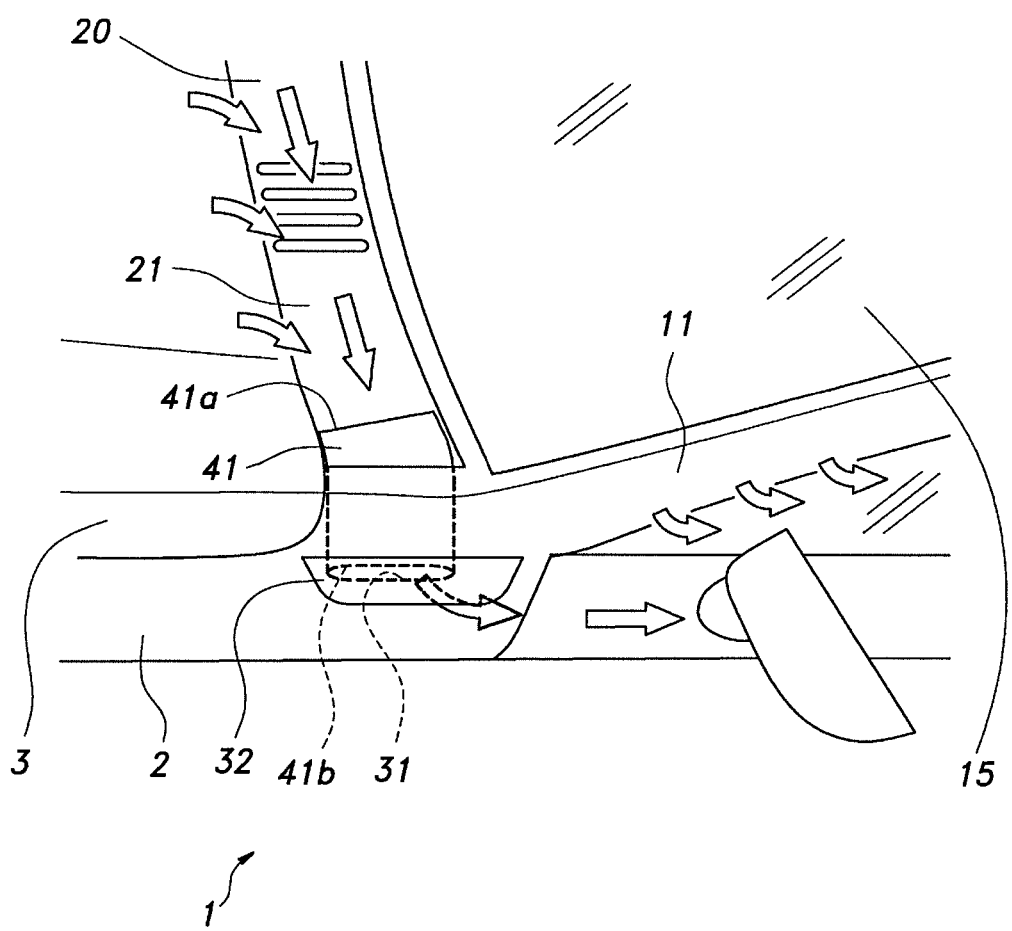
FIG. 6 is a plan view of a relevant part illustrating the operation according to the example.
Figure 7:
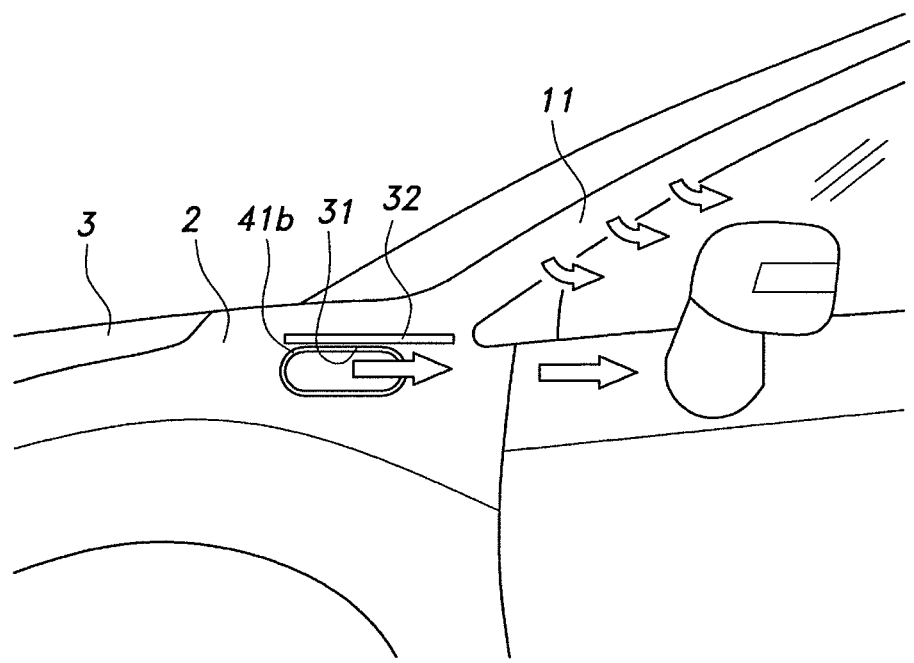
FIG. 7 is a side view of a relevant part illustrating the operation according to the example.

As indicated by arrows in FIGS. 6 and 7, the air flowing in the width direction along the front surface of the front windshield 15 to the rear edge of each front pillar 11 becomes a vertical vortex, which flows around toward the center of the vehicle body, immediately after separating from the rear edge of the front pillar 11 and collides with the air flowing alongside the front pillar 11 so as to produce wind noise.

As illustrated in FIGS. 6 and 7, the air flowing into the gutter space 22 flows through the gutter space 22 toward the widthwise ends thereof along the gutter 21, which is curved such that the opposite ends face rearward. After being introduced to the airflow outlet ducts 41, the air passes through the airflow outlet ducts 41 and is discharged from the airflow outlet holes 31 located below the rising start sections of the front pillars 11. In this case, since each airflow outlet duct 41 has a cross-sectional area larger than or equal to the cross-sectional area of each end of the gutter space 22 and has a duct shape that is substantially fixed, the air flowing through the gutter space 22 reaches the airflow outlet hole 31 substantially without receiving resistance. The rectifying plate 32 may prevent the air discharged from the airflow outlet hole 31 from flowing toward the front pillar 11 located thereabove, so that the discharged air flows rearward together with the air flowing alongside the front fender 2. Thus, the air flowing into the cowl panel 20 is less likely to merge with the flow of air near the front pillar 11, whereby an increase in wind noise caused by an intensified vertical vortex may be effectively suppressed.

As described above, in the vehicle wind-noise reduction structure according to this example, the lateral ends of the cowl panel 20 are provided with the airflow outlet ducts 41 that extend continuously to the gutter space 22 and that have the airflow outlet holes 31 at the side surfaces of the front fenders 2, and the airflow outlet holes 31 are located below the rising start sections where the front pillars 11 start to rise from the main body 10.

Accordingly, the air flowing in the width direction through the gutter space 22 of the cowl panel 20 is guided to the airflow outlet ducts 41 so that the air can be discharged from below the rising start sections of the front pillars 11. Thus, the air flowing through the gutter space 22 of the cowl panel 20 may be prevented from merging with the flow of air below the front pillars 11, whereby wind noise can be reduced.

Furthermore, the cross-sectional area of each airflow outlet duct 41 is larger than or equal to the cross-sectional area of each end of the gutter space 22.

Accordingly, since the air flowing through the gutter space 22 can reach the airflow outlet holes 31 substantially without receiving resistance, the air flowing through the gutter space 22 of the cowl panel 20 may be more reliably prevented from merging with the flow of air below the front pillars 11.

Furthermore, the side surfaces of the main body 10 are provided with the rectifying plates 32 that are located above the airflow outlet holes 31 and that guide the air discharged from the airflow outlet holes 31 rearward.

Thus, the air discharged from the airflow outlet holes 31 by the rectifying plates 32 may be more reliably prevented from merging with the flow of air near the front pillars 11, whereby an increase in wind noise may be effectively suppressed.

The above-described example is not limited thereto, and various modifications are permissible. For instance, although the above-described example is applied to a sedan-type passenger car, the example may alternatively be applied to, for instance, a van-type automobile, a minivan-type (so-called compact-van-type) automobile, or a convertible-type automobile. Furthermore, as an alternative to being disposed in the front fenders as described in the above example, the airflow outlet holes may be disposed in one of the front pillars, the front doors, and the front hood depending on differences in the body structure or the component sizes. Moreover, the cowl panel may be a press-molded component, such as a steel plate, or may have a cross-sectionally V-shaped gutter that defines a gutter space having an inverted triangular shape in cross section.

The invention claimed is:

1. A wind-noise reduction structure for a vehicle, the vehicle including a front windshield provided above a main body, a front pillar that rises rearward and obliquely upward from the main body and supports a lateral edge of the front windshield, and a cowl that is provided below the front windshield and has a gutter into which air flowing above a front hood constituting the main body flows when the vehicle moves forward, the structure comprising:
   a lateral end of the cowl that is provided with an airflow outlet path extending continuously to a gutter space formed in the gutter and has an opening in a side surface of the main body, and through which the air which flows into the gutter space passes,
   wherein the opening of the airflow outlet path is located below a rising start section where the front pillar starts to rise from the main body.

2. The wind-noise reduction structure for a vehicle according to claim 1, wherein the airflow outlet path has a cross-sectional area that is larger than or equal to a cross-sectional area of an end of the gutter space.

3. The wind-noise reduction structure for a vehicle according to claim 1, wherein the side surface of the main body is provided with a rectifying member that is located above the opening of the airflow outlet path and that guides air discharged from the opening of the airflow outlet path rearward.

4. The wind-noise reduction structure for a vehicle according to claim 2, wherein the side surface of the main body is provided with a rectifying member that is located above the opening of the airflow outlet path and that guides air discharged from the opening of the airflow outlet path rearward.

5. The wind-noise reduction structure for a vehicle according to claim 1, wherein the opening of the airflow outlet path is provided in any one of a front fender, the front pillar, a door, and a front hood, which constitute the main body.

6. The wind-noise reduction structure for a vehicle according to claim 2, wherein the opening of the airflow outlet path is provided in any one of a front fender, the front pillar, a door, and a front hood, which constitute the main body.

7. The wind-noise reduction structure for a vehicle according to claim 3, wherein the opening of the airflow outlet path is provided in any one of a front fender, the front pillar, a door, and a front hood, which constitute the main body.

8. The wind-noise reduction structure for a vehicle according to claim 4, wherein the opening of the airflow outlet path is provided in any one of a front fender, the front pillar, a door, and a front hood, which constitute the main body.

9. A wind-noise reduction structure for a vehicle, the vehicle including a front windshield provided above a main body, a front pillar that extends upward from the main body and supports a lateral edge of the front windshield, and a cowl that is provided below the front windshield and has a gutter into which air flowing above a front hood constituting the main body flows when the vehicle moves forward, the structure comprising:
   a lateral end of the cowl that is provided with an airflow outlet path extending continuously to a gutter space formed in the gutter and has an opening in a side surface of the main body, and through which the air which flows into the gutter space passes.

10. The wind-noise reduction structure for a vehicle according to claim 9, wherein the opening of the airflow outlet path is provided in any one of a front fender, the front pillar, a door, and a front hood, which constitute the main body.

11. The wind-noise reduction structure for a vehicle according to claim 10, wherein the airflow outlet path is provided in the front fender.

12. The wind-noise reduction structure for a vehicle according to claim 5, wherein the airflow outlet path is provided in the front fender.

* * * * *